(12) United States Patent
Thompson

(10) Patent No.: US 7,250,003 B2
(45) Date of Patent: Jul. 31, 2007

(54) ENCAPSULATED FASTENER AND METHOD AND TOOLING FOR MANUFACTURING SAME

(76) Inventor: Steven L. Thompson, 113 S. 170th, Girard, KS (US) 66743

( * ) Notice: Subject to any disclaimer, the term of this patent is extended or adjusted under 35 U.S.C. 154(b) by 168 days.

(21) Appl. No.: 11/186,605

(22) Filed: Jul. 21, 2005

(65) Prior Publication Data

US 2007/0020063 A1   Jan. 25, 2007

(51) Int. Cl.
*B21D 53/24* (2006.01)

(52) U.S. Cl. .......................... 470/18; 470/24; 470/49; 470/87; 470/197; 264/271.1

(58) Field of Classification Search .................. 470/2, 470/5, 18, 20, 24, 48, 49, 87, 197; 264/263, 264/271.1, 274, 275, 278; 425/125, 127, 425/517; 411/377, 429, 431, 908
See application file for complete search history.

(56) References Cited

U.S. PATENT DOCUMENTS

| | | | |
|---|---|---|---|
| 3,620,119 A * | 11/1971 | King, Jr. et al. ............ 411/399 |
| 4,883,399 A | 11/1989 | MacLean |
| 4,887,950 A | 12/1989 | Sakayori et al. |
| 4,907,929 A | 3/1990 | Johnston, Jr. |
| 4,962,806 A * | 10/1990 | Nottelmann et al. ........ 164/112 |
| 5,553,984 A | 9/1996 | Smith |
| 6,001,294 A * | 12/1999 | Inaba et al. ................. 264/278 |
| 6,096,256 A * | 8/2000 | Aretz .......................... 264/263 |
| 6,641,382 B2 * | 11/2003 | Mine .......................... 425/116 |

* cited by examiner

Primary Examiner—Ed Tolan (57) ABSTRACT

An encapsulated fastener includes a nut adapted to receive a bolt. The nut is encapsulated by an encapsulation including an extension, which includes a tube adapted for receiving a portion of the bolt and a flange adapted for engaging a face of the nut. The encapsulation extension is placed on the nut in an overmolding tool, wherein an encapsulation base is injection molded over a portion of the encapsulation extension. The encapsulation base encapsulates the nut, except its bore, which is sealed off during the overmolding process by a spring-mounted mandrel. Alternative embodiments of the invention include tubes with different configurations for contacting the bolt whereby the tube or cylinder is reinforced. A method and tooling for manufacturing the encapsulated fastener are also provided.

12 Claims, 7 Drawing Sheets

ENCAPSULATED FASTENER AND METHOD AND TOOLING FOR MANUFACTURING SAME

BACKGROUND OF THE INVENTION

1. Field of the Invention

The present invention relates generally to fasteners, and in particular to an encapsulated fastener and a method and tooling for manufacturing same.

2. Description of the Related Art

Mechanical fasteners are available in a wide variety of designs, which accommodate various objects being joined. The specific fastener design features are generally determined by such criteria as the functional requirements of the applications, the static and dynamic loads imposed thereon, the materials being fastened and the operating environment.

Threaded fasteners include bolts, nuts, screws, threaded rods and the like. An advantage of such fasteners is that they can be tightened and loosened with readily available hand and power tools. Consequently, threaded fasteners are used extensively in construction, manufacturing and other industries.

Although steel is a logical material choice for many fasteners based on high strength and low cost, many steel alloys are susceptible to rust, corrosion and galvanic action. Such effects can be countered in some applications by making the fasteners of stainless steel and other alloys that are resistant to rust and corrosion. However, such materials tend to be relatively expensive or ineffective in applications requiring the cost-effectiveness and material strength of steel. Another solution is to zinc-coat (i.e. galvanize), paint or otherwise provide surface protection for the fasteners. However, such solutions can be ineffective in highly corrosive liquid environments, such as salt water, wastewater, process chemicals, acid compounds and base compounds. Examples of highly corrosive dry materials include fertilizers, calcium chloride and other caustic powders and granular materials. In addition to corrosion resistance, impact and abrasion resistance are important design objectives for fasteners installed in severe service applications.

Fasteners that can withstand such severe service conditions are used extensively in the construction of tanks and other vessels for processing, storing and transporting highly corrosive liquids and solid bulk materials. Various applications for such fasteners are found in a number of industries, including petrochemical, manufacturing, agriculture, transportation, construction, defense, etc.

For example, large tanks and storage vessels are commonly constructed on site using prefabricated steel panels, which can be coated or lined with suitable corrosion-resistant materials. Bolting the panels together on site tends to be a relatively efficient and cost-effective construction method. Moreover, bolts and nuts have the advantage of installing with basic hand and power tools.

The prior art includes bolts and nuts encapsulated in injection-molded plastics, which can provide the necessary chemical resistance and other physical characteristics for these applications. For example, snap-on and spin-on plastic covers have previously been utilized for protecting the exposed portions of nut-and-bolt fasteners. The prior art also includes deep metal nuts with blind-end threaded receivers with sufficient lengths to enclose the bolts. Such nuts can be coated with anti-corrosive materials. However, such specialized fasteners tend to be more expensive than standard-size nuts. Moreover, manufacturing techniques generally require gripping the extended nuts by their interior internal threads in order for the entire exterior surface to be effectively coated. Another prior art nut encapsulation technique involves encapsulating standard size nuts in plastic materials with extensions adapted for receiving the bolt shafts protruding from the nuts. Problems with such encapsulation configurations include misalignment between bolt and extension internal threads and unsupported extensions when the extension bores are oversized to avoid contact with the bolt shafts received therein.

Heretofore there have not been available an encapsulated fastener and a method and tooling for manufacturing same with the advantages and features of the present invention.

BRIEF DESCRIPTION OF THE INVENTION

In the practice of an aspect of the present invention, an encapsulated fastener is provided, which includes a two-part encapsulation comprising a base encapsulating a nut and an extension encapsulating a portion of a bolt extending from the base. A manufacturing method embodying the present invention includes the steps of injection molding the encapsulation extension, placing it on a nut and overmolding the base over the nut and a portion of the extension with tooling embodying another aspect of the invention.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning. The invention can be fabricated in various sizes and configurations from a wide variety of suitable materials, which are chosen for their characteristics according to the intended use and the operation of the invention. For example, engineered plastics, such as glass-filled nylon, can be chosen for such characteristics as chemical resistance, rigidity and toughness. Without limitation on the range of suitable materials for manufacturing the encapsulated fasteners and practicing the manufacturing method, a wide range of plastics and other formable materials can be utilized to satisfy the applicable performance, manufacturing and cost parameters.

II. Encapsulated Nut 2

Figures 1, 18, 19:
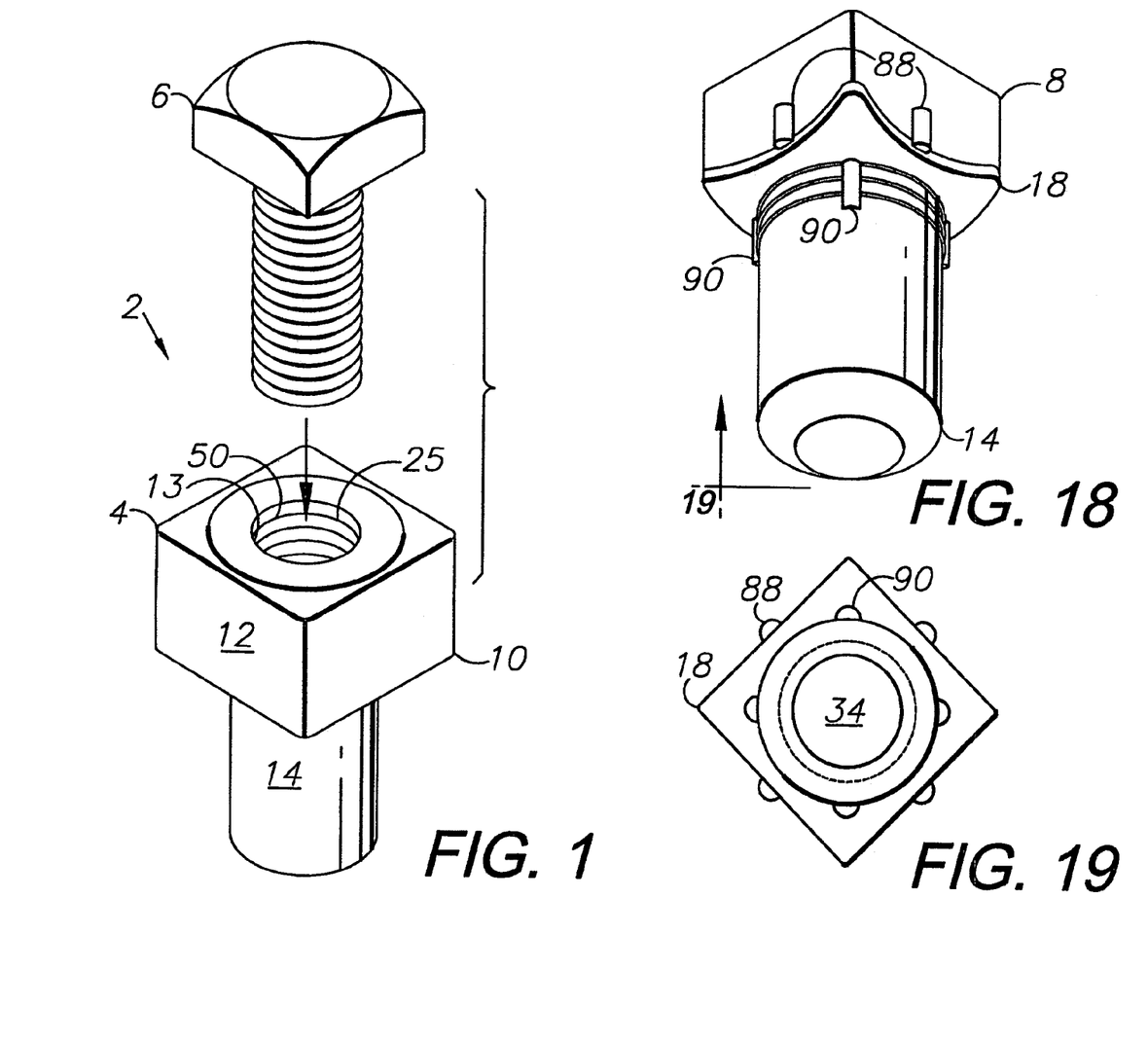
FIG. 1 is a perspective view of a fastener including an encapsulated nut embodying an aspect of the present invention.
FIG. 18 is a perspective view of a nut and encapsulation extension embodying another aspect of the present invention.
FIG. 19 is a distal end elevational view thereof.
Figure 2:
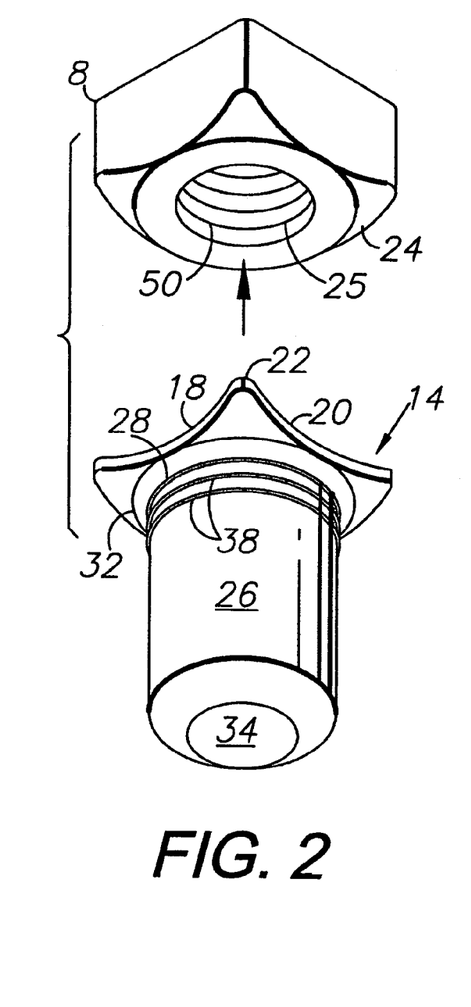
FIG. 2 is a perspective view of a nut and an encapsulation extension.
Figure 3:
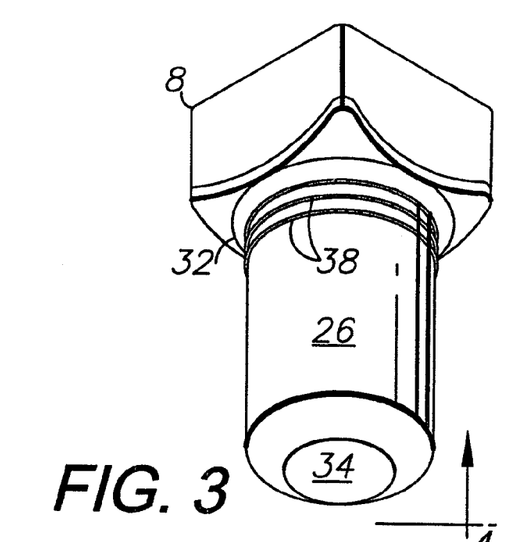
FIG. 3 is a perspective view of the nut placed on the encapsulation extension.
Figure 4:
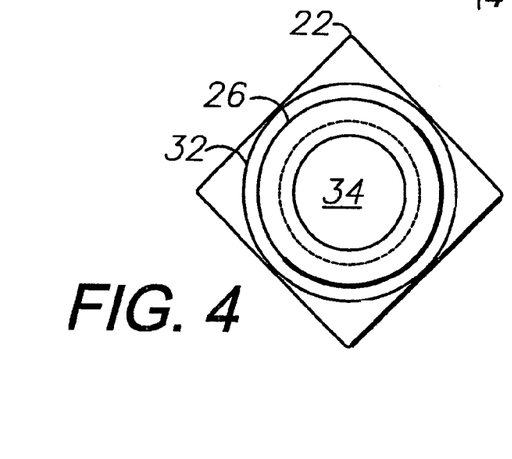
FIG. 4 is a distal end view of the encapsulation extension.

Referring to FIG. 1 in more detail, the reference numeral 2 generally designates a fastener comprising an encapsulation nut 4 adapted for threadably receiving a bolt 6. The encapsulated nut 4 includes a nut 8 within an encapsulation 10 generally comprising an encapsulation base 12 and an encapsulation extension or hat 14. The nut 8 includes a nut bore 25 and is shown with a four-sided configuration, although hex nuts and other shapes could be employed with the present invention. As shown in FIGS. 2–4, the nut 8 is adapted for placement on the encapsulation extension 14. The encapsulation extension or hat 14 includes a flange 18, which can have a concave proximal face 20 with corners 22, which are turned to form the concave configuration and accommodate the nut 8, which has a corresponding convex face 24 adapted for mating with the concave proximal face 20 of the flange 18 whereby the nut 8 can be supported on the extension 14 in a predetermined, aligned configuration, as shown in FIG. 3. The extension also includes a distal cylinder 26 with a proximal end 28, which intersects the flange 18 at an annular junction 32, which can be radiused or filleted as shown for greater strength. The extension cylinder 26 includes a closed, distal end 34 whereat an inner, cylinder bore 36 terminates, thus providing the cylinder 26 with a closed-end configuration for encapsulating a portion of the bolt 6. The cylinder 26 also includes multiple (e.g., two are shown), annular rings 38, which are located distally from the junction 32. The encapsulation extension 14 can be fabricated by any suitable process, such as injection molding, casting, etc. using any suitable materials, such as engineered plastics, thermoplastics, glass-filled nylon, etc.

Figure 5:
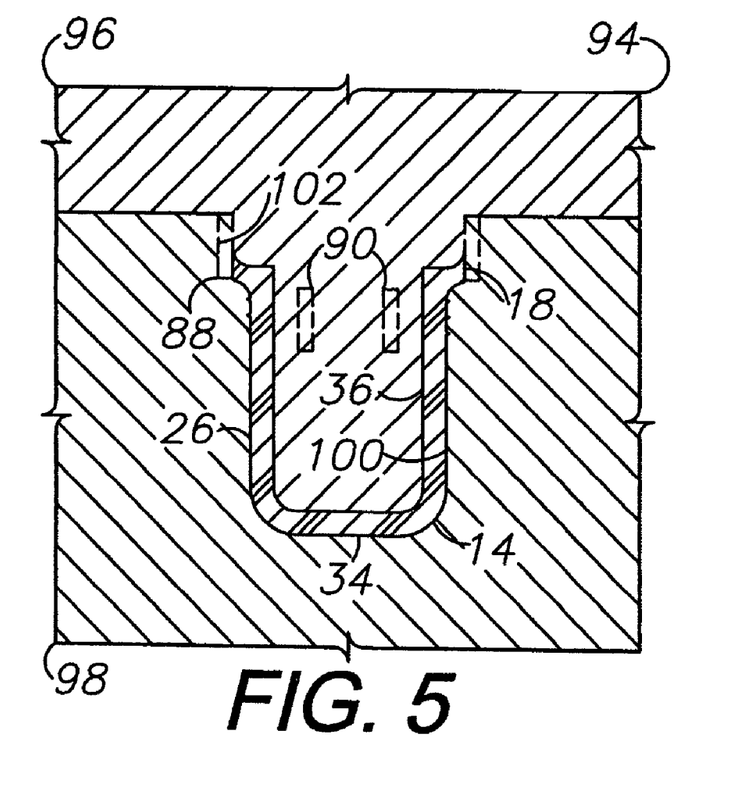
FIG. 5 is a cross-sectional view of a tool for injection molding the encapsulation extension.
Figures 6A, 6B:
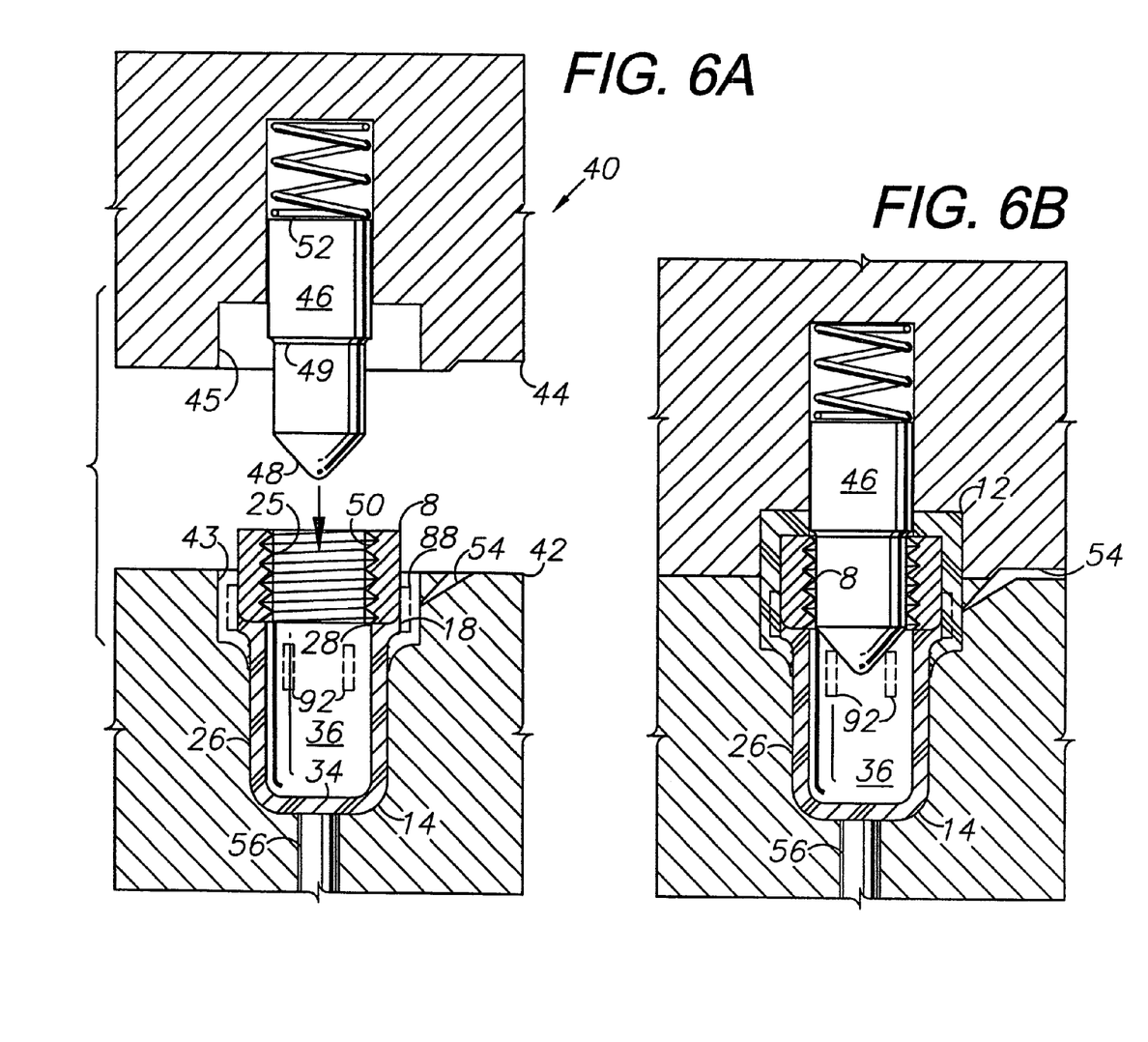
FIG. 6A is a cross-sectional view of an overmolding tool for encapsulating nuts according to the present invention, shown in an open position with the nut and the encapsulation extension in place.
FIG. 6B is another cross-sectional view of the overmolding tool, shown in a closed position with the nut fully encapsulated.
Figure 7:
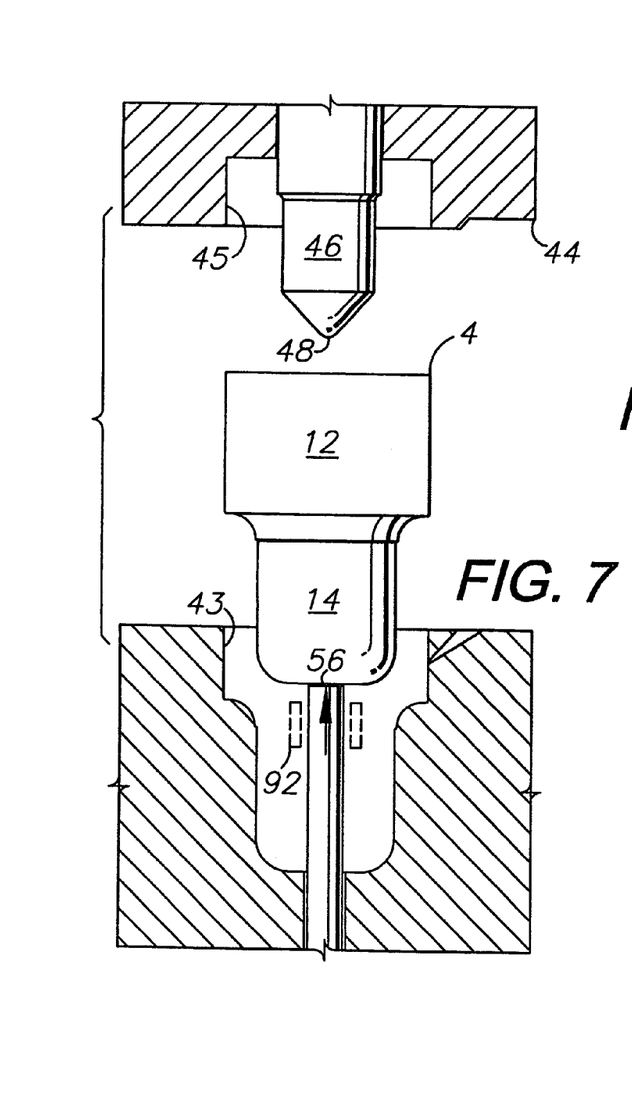
FIG. 7 is another cross-sectional view of the overmolding tool, shown in an open position with the encapsulated nut being ejected.

FIG. 5 shows a tool 94 for injection molding the encapsulation extension 14. The tool 94 can comprise any suitable mold, such as an injection mold as shown with upper and lower mold halves 96, 98 and a mold cavity 100. FIGS. 6A, 6B and 7 show an overmolding tool 40 adapted for overmolding the encapsulation base 12 over the nut 8, the flange 18 and a portion of the cylinder 26 at a secure, fused interface adjacent to the cylinder proximate end 28. The overmolding tool 40 is shown in an open position in FIG. 6A and includes a first or lower mold half 42 with a first or lower cavity 43 adapted to receive the encapsulation extension 14 and a second or upper mold half 44 with a second or upper cavity 45, which includes a spring-mounted mandrel 46 reciprocably received in a mandrel receiver 47. The mandrel 46 includes a conical end 48 and a shoulder 49 adapted for engaging the nut 8 in a secure, sealing connection with the internal threads 50 of the nut bore 25 with the mandrel 46 located within the nut 8, as shown in FIG. 6B (tool 40 closed). In this configuration the mandrel 46 substantially seals the nut bore 25 and the extension cylinder bore 36 whereby plastic is excluded during the encapsulation base 12 overmolding step.

The spring-compressed close fit of the nut convex face 24 and the flange proximal face 20 further seal the encapsulation extension 14 against the injected overmolding plastic. The mandrel 46 is biased downwardly by a compression spring 52, which is adapted for accommodating variations in thicknesses of nuts 8 and tends to press the nut convex face 24 tightly and sealingly against the flange proximal face 20.

A subgate 54 is formed in the overmolding tool 40 for receiving the molten material for molding the encapsulation base 12, which preferably fuses with the portion of the encapsulation extension 14 exposed within the lower mold cavity 43. The distal-most ring 38 provides a stop for the encapsulation base 12 material. FIG. 7 shows the upper mold half 44 raised and an ejector pin 56 protruding upwardly into the lower mold cavity 43 for engaging the cylinder distal end 34 and ejecting the completed encapsulated nut 4.

Figure 8:
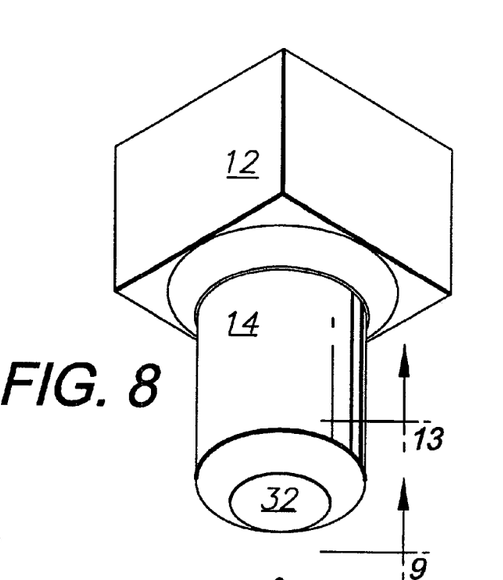
FIG. 8 is a perspective view of an encapsulated nut embodying another aspect of the present invention.
Figure 9:
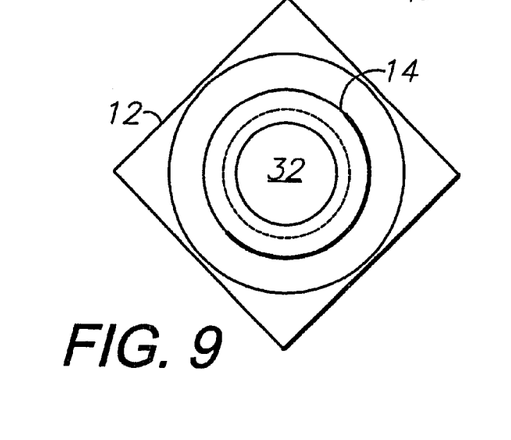
FIG. 9 is a distal end view thereof.

FIGS. 1, 8 and 9 show the completed encapsulated nut 4. The two-step process of molding the encapsulation extension 14 and overmolding the encapsulation base 12 on the nut 8 and a portion of the encapsulation extension 14 results in a relatively strong, impact-resistant assembly. The encapsulation base 12 includes an opening 13, which is aligned with and has approximately the same diameter as the nut bore 25. The opening 13 is formed by the mandrel 46. The encapsulation parts 12, 14 preferably fuse in the overmolding process and thereby attain strength characteristics similar to a monolithically molded encapsulation.

Figures 10, 11, 12:
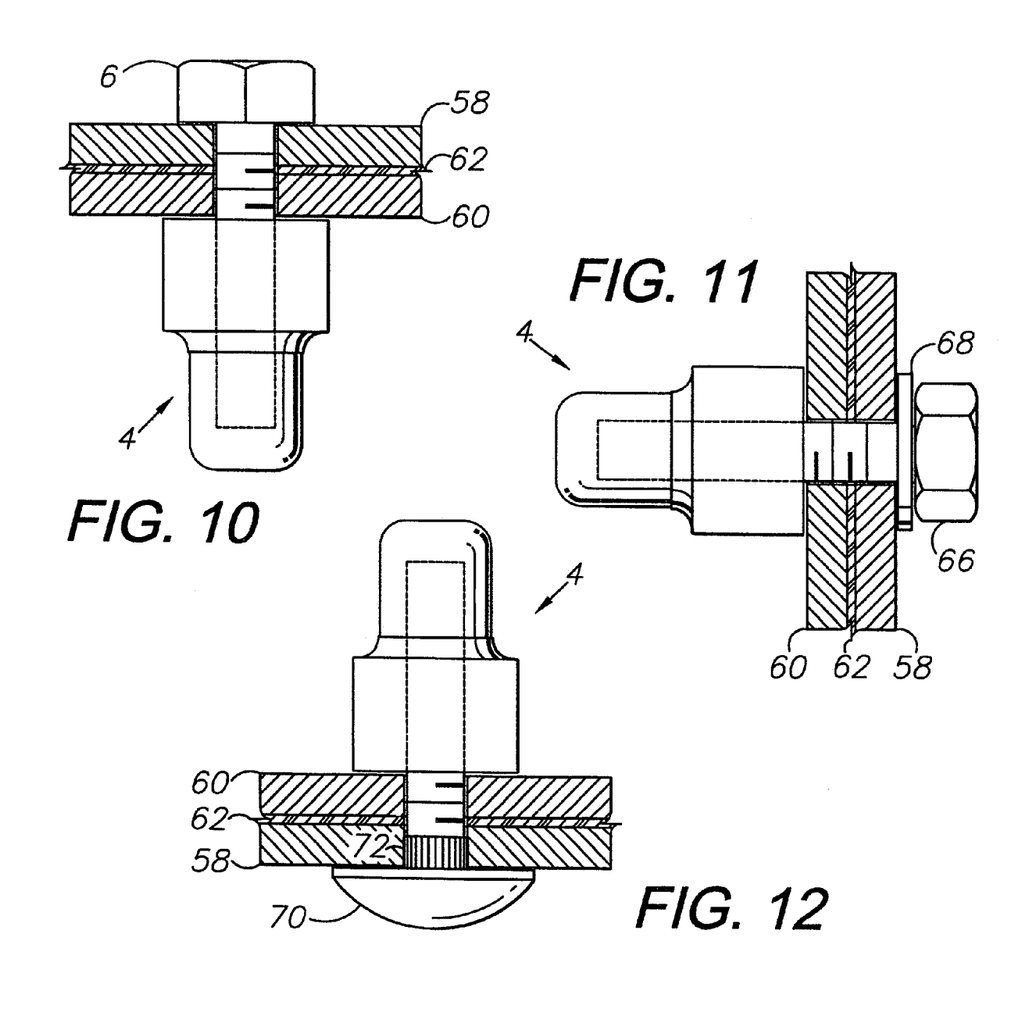
FIG. 10 is a cross-sectional view of an application of the encapsulated nut.
FIG. 11 is a cross-sectional view of another application of the encapsulated nut.
FIG. 12 is a cross-sectional view of another application of the encapsulated nut.

Applications of fasteners embodying aspects of the present invention are shown in FIGS. 10–12. FIG. 10 shows first and second plates 58, 60 with a gasket 62 therebetween and a square-headed bolt received in an encapsulated nut 4. FIG. 11 shows a hex bolt 66 with a washer 68. FIG. 12 shows a carriage bolt 70 with a finned neck 72. In all of these applications, and various others not shown, the encapsulation 10 of the present invention effectively protects the nut 8 and the bolts 6, 66, 70 from the contents of a vessel or other structure enclosed by the plates 58, 60. As shown in FIGS. 10–12, the fasteners embodying the present invention can be installed in various orientations. The overmolding of the encapsulation base 12 provides a strong and secure interface with the nut 8 whereby sufficient force can be applied with a wrench or similar tool in order to tightly torque the fasteners 2.

Figure 13:
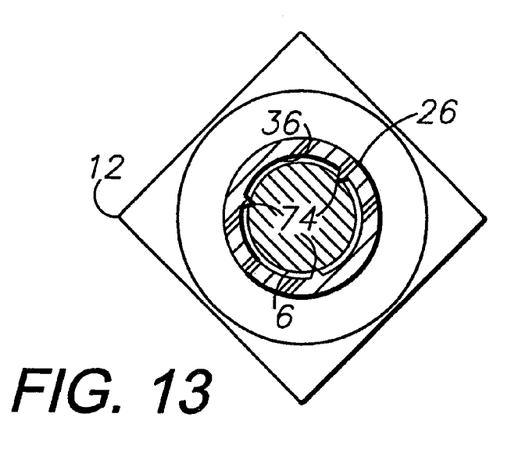
FIG. 13 is a cross-sectional view of the encapsulated nut taken generally along line 13 in FIG. 8.
Figure 14:
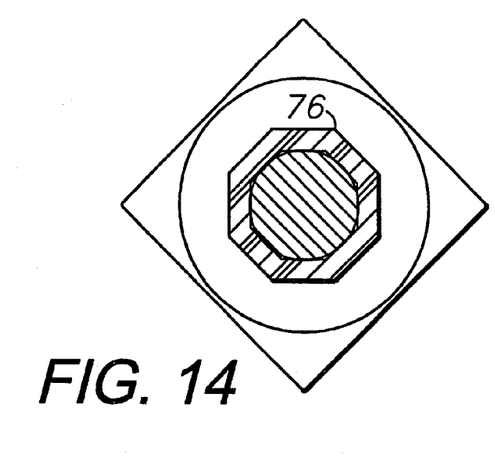
FIG. 14 is a cross-sectional view of an encapsulated nut embodying another aspect of the present invention.
Figure 15:
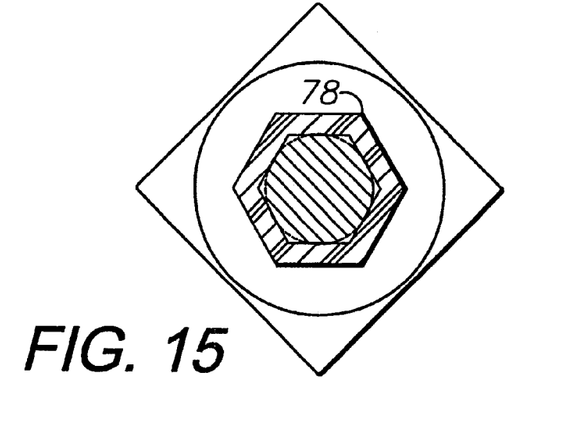
FIG. 15 is a cross-sectional view of an encapsulated nut embodying another aspect of the present invention.
Figure 16:
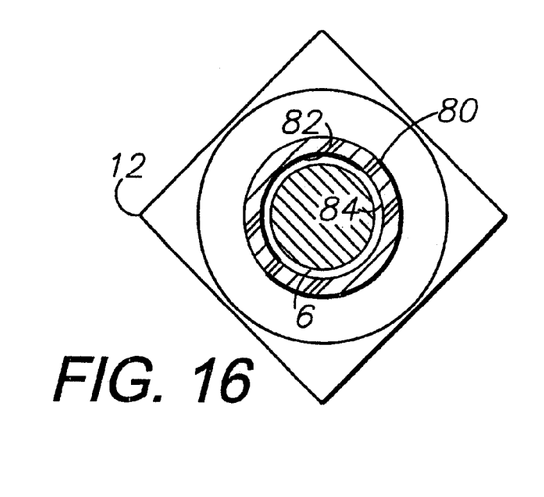
FIG. 16 is a cross-sectional view of an encapsulated nut embodying another aspect of the present invention.

FIGS. 13–16 show alternative configurations for the extension cylinder, which can be adapted for structural reinforcement through contact with the bolt 6. FIG. 13 shows multiple (e.g., three are shown) splines 74 within the bore 36 of the extension cylinder 26. The shaft of the bolt 6 (dashed lines) is in contact with the splines 74, whereby the extension cylinder 26 is reinforced by the bolt 6 and is thus more impact-resistant. FIG. 14 shows a modified, octagonal extension tube 76, which contacts the bolt 6 along each of its eight sidewalls. FIG. 15 shows a similar, hexagonal extension tube 78. FIG. 16 shows an oversized cylindrical tube 80 with a bore 82 having an inside diameter greater than the outside diameter of the bolt 6, whereby an annular clearance space 84 is formed therebetween. This configuration avoids any interference between the bolt 6 and the extension cylinder 80, which may be preferred in some applications. Other constructions within the scope of the present invention can include interference-fitting cylinders with smaller inside diameters, internal threading within the cylinder 26 aligned with the nut internal threads 50, and other variations providing interference and interference-free clearance. The cylinder bore 36 can receive various sealant, adhesive and epoxy compounds for enhancing the strength, impact-resisting and sealing characteristics of the installed fasteners.

Figure 17:
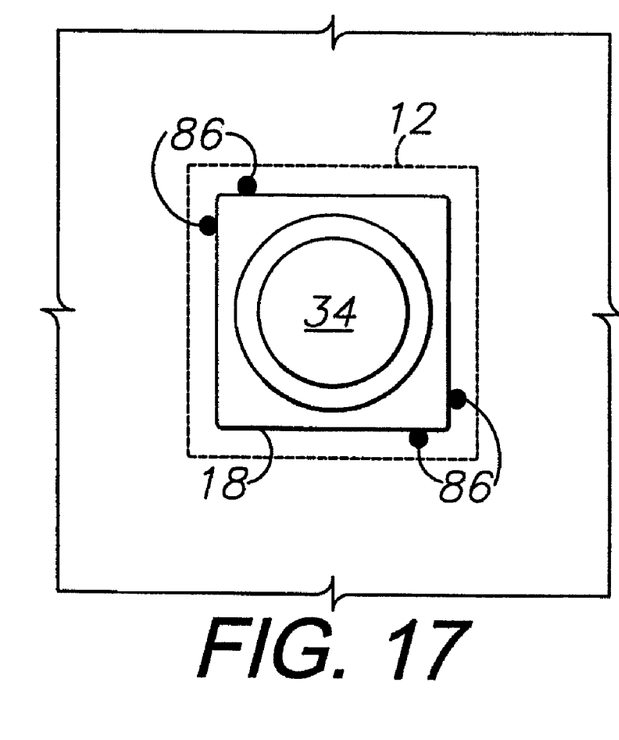
FIG. 17 is a distal end view of the encapsulation extension, shown in a mold with corner locator/ejector pins.

FIG. 17 shows two pairs of locator/ejector pins 86, which can be located at opposite corners of the nut 8 and under the encapsulation base 12 (dashed lines) whereby the nut 8 is positioned prior to the overmolding step during which the pins 86 are retracted (e.g., into the lower mold half 42) and after which they extend to eject the completed encapsulated nut 4. FIGS. 18 and 19 show locating spurs 88 formed on the edges of the flange 18 for engaging the sides of the nut 8. The locating spurs 88 can be molded in optional subcavities 102 in the injection molding tool 94 (FIG. 5). Alignment ribs 90 are provided on the encapsulation extension cylinder 26, e.g. at 90° radial spacing, for maintaining the encapsulation extension 14 in proper alignment within the lower mold half 42. The alignment ribs 90 can be formed in the injection molding tool 94 (FIG. 5) and received in optional alignment rib receivers 92 (FIGS. 6A, 6B and 7) for properly aligning the encapsulation extension 14 within the lower mold half 42.

It is to be understood that the invention described here in can be embodied in various forms, and is not to be limited to the examples discussed above. Other components and configurations can be utilized in the practice of the present invention.

Having thus described the invention, what is claimed as new and desired to be secured by Letters Patent is:

1. An encapsulated fastener manufacturing method, which comprises the steps of:
   providing an encapsulation extension molding tool adapted for molding encapsulation extensions;
   molding an encapsulation extension including a tube with proximate and distal ends and a tube bore open at said proximate end and generally aligned with said nut bore;
   molding said encapsulation extension with a flange located at said tube proximate end;
   providing a nut with first and second faces, an internally-threaded bore extending between and open at said faces and at least one sidewall;
   placing said nut on said encapsulation extension with said flange face engaging a respective nut face;
   providing an overmolding tool with first and second mold halves with respective first and second mold cavities and a mandrel with an end adapted to engage said nut and close said nut bore;
   providing a compression spring in said second mold half and engaging said mandrel with said compression spring;
   closing said mold halves;
   partially inserting said mandrel end into said nut bore and thereby pressing said nut and encapsulation extension into said first cavity;
   injecting molten plastic into said first and second cavities to overmold said nut, said flange and said tube proximate end with an encapsulation base;
   fusing said encapsulation base onto said flange and said tube proximate end; and
   forming an encapsulation base opening adapted for receiving a bolt in said encapsulation base in alignment with said nut bore.

2. The method according to claim 1, which includes the additional steps of:
   sizing said nut bore to accommodate a predetermined bolt size;
   providing said encapsulation extension tube bore with a contact area adapted for contacting said bolt therein; and
   reinforcing said encapsulation extension tube with said bolt and protecting said bolt with said encapsulation extension tube.

3. The method according to claim 2, which includes the additional step of:
   forming said contact area engaging said bolt with either multiple, longitudinally-extending splines or multiple, flat faces of said tube bore.

4. The method according to claim 1, which includes the additional steps of:
   providing said overmolding tool first half with an ejector pin having a retracted position adjacent to said first half cavity and an extended position extending into same; and
   ejecting said encapsulated nut from said first half cavity with said overmolding tool in its open positioned.

5. The method according to claim 1, which includes the additional step of:
   providing said overmolding tool with two pairs of locator/ejector pins having retracted positions located in said first mold half and extended positions extending into said first mold half cavity;
   locating opposite corners of said nut in engagement with said locator/ejector pin pairs with said pins extended into said first mold half cavity;
   retracting said pins into said first mold half during said overmolding step; and
   extending said pins into their extended positions to eject said encapsulated nut.

6. The method according to claim 1, which includes the additional steps of:
   providing said encapsulation extension with multiple, longitudinally-extending alignment ribs on said tube at radially-spaced intervals around its outer surface; and
   providing said overmolding tool first half with multiple alignment rib receivers adapted for receiving said alignment ribs with said encapsulation extension located in said mold first half.

7. The method according to claim 1, which includes the additional steps of:

providing said encapsulation extension with multiple locating spurs each attached to a respective flange side; and placing said nut on said encapsulation flange with said locating spurs engaging respective nut sides.

8. The method according to claim 1, which includes the additional step of:

provided a subgate in one of said mold halves and extending into one of said mold cavities; and injecting material into said mold cavities through said subgate with said overmolding tool in its closed position.

9. The method according to claim 1, which includes the additional steps of:

providing multiple overlying plates of a structure with aligned receivers;

placing a bolt in said aligned receivers;

placing a head of said bolt on an outer surface of said plates;

threading said encapsulated nut on said bolt and in engagement with an inside surface of said plates;

sealing said nut and at least a portion of said bolt with said encapsulation; and reinforcing said encapsulation extension with said bolt.

10. Tooling for manufacturing an encapsulated fastener including a nut having first and second faces, multiple sidewalls and an internally-threaded bore extending between said faces, an encapsulation extension placed on said nut and an encapsulation base overmolded around said nut and a portion of said encapsulation extension, which comprises:

an injection mold including a mold cavity adapted for injection molding an encapsulation extension including a flange with a concave proximal face, multiple sides, an extension tube with a proximal end connected to said flange, a closed distal end and a tube bore;

an overmolding tool including a lower half with a lower cavity for receiving the encapsulation extension with said nut placed on said flange concave face and said nut and tube bores aligned;

said overmolding tool including an upper half with an upper cavity and a mandrel receiver;

a mandrel reciprocably received in said mandrel receiver and including a conical lower end and an annular shoulder located above said lower end;

a compression spring located in said mandrel receiver and engaging said mandrel, said compression spring biasing said mandrel downwardly;

said overmolding tool having a closed position with said mandrel lower end received in said nut bore and said mandrel shoulder engaging said nut first face;

said overmolding tool having an open position with said upper half spaced from said lower half;

an ejector device mounted in said lower half and having a retracted position with said overmolding tool in its closed position and an extended position with said overmolding tool in its open position, said ejector device being adapted for ejecting said encapsulated nut; and a subgate in said overmolding tool communicating with said upper and lower cavities with said overmolding tool in its closed position, said subgate being adapted for injecting material into said cavities.

11. The tooling according to claim 10, which includes:

said ejector device comprising an ejector pin with a retracted position located in said lower mold half adjacent to said lower cavity with said overmolding tool in its closed position and an extended position extending into said lower cavity and adapted for ejecting said encapsulated nut with said overmolding tool in its open position.

12. The tooling according to claim 10, which includes:

said lower cavity including multiple alignment rib subcavities; and said encapsulation extension tube including multiple alignment ribs received in said alignment rib subcavities with said encapsulation extension located in said lower mold half.

* * * * *